United States Patent [19]

Brennan et al.

[11] 4,252,860
[45] Feb. 24, 1981

[54] METHOD OF INCREASING IMPACT STRENGTH OF SILICON NITRIDE

[75] Inventors: John J. Brennan, Portland; Francis S. Galasso, Manchester; Charles O. Hulse, Glastonbury, all of Conn.

[73] Assignee: United Technologies Corporation, Hartford, Conn.

[21] Appl. No.: 54,522

[22] Filed: Jul. 2, 1979

Related U.S. Application Data

[63] Continuation-in-part of Ser. No. 869,331, Jan. 13, 1978, abandoned.

[51] Int. Cl.$^3$ .................. B32B 9/04; B32B 13/04
[52] U.S. Cl. .................. 428/446; 427/255.4; 427/343; 427/372.2
[58] Field of Search .......... 427/248 E, 372 A, 372 R, 427/402, 376 A, 94, 343, 255, 344, 255.4, 397.7, 372.2, 376.2, 299; 428/446

[56] References Cited

U.S. PATENT DOCUMENTS

| | | | |
|---|---|---|---|
| 3,394,026 | 7/1968 | Parr et al. | 428/446 |
| 3,854,189 | 12/1974 | Ezis et al. | 423/344 |
| 3,885,294 | 5/1975 | Chaundy et al. | 423/344 |
| 3,887,411 | 6/1975 | Goodyear et al. | 156/155 |
| 3,887,412 | 6/1975 | Styhr et al. | 156/155 |
| 4,090,851 | 5/1978 | Beikman et al. | 427/94 |
| 4,118,539 | 10/1978 | Hirai et al. | 428/446 |

OTHER PUBLICATIONS

Poponiak et al, "Thick Wear Resistant Coatings for Silicon Devices", IBM Tech. Disclosure Bulletin, vol. 18, No.12 May, 1976.

Poponiak et al. "Formation of Thick $Si_3N_4$ or $Si_xO_yN_z$ On Sl Substrate by Anodnitridization", vol. 19, No. 3, Aug. 1976.

*Primary Examiner*—Ronald H. Smith
*Assistant Examiner*—S. L. Childs
*Attorney, Agent, or Firm*—Charles E. Sohl

[57] ABSTRACT

A method is described for increasing the impact properties of dense silicon nitride articles. The method includes the application of a slurry composed predominately of silicon powder to the surface of the dense silicon nitride article. The slurry coated article is then nitrided at an elevated temperature to partially convert the silicon powder to silicon nitride and to bond the particles together and to the substrate. About 15 to 45 volume percent of the silicon powder is not converted to silicon nitride but remains as elemental silicon.

5 Claims, No Drawings

METHOD OF INCREASING IMPACT STRENGTH OF SILICON NITRIDE

The invention described herein was made in the course of or under a contract with the National Aeronautics and Space Administration.

BACKGROUND OF THE INVENTION

This application is a Continuation-In-Part of application U.S. Ser. No. 869,331 filed Jan. 13, 1978 and now abandoned.

FIELD OF THE INVENTION

This invention relates to methods for producing impact resistant silicon nitride articles.

Description of the Prior Art

Silicon nitride is a ceramic material having the formula $Si_3N_4$. The properties of this ceramic include good mechanical properties at elevated temperatures, good resistance to oxidation and relatively low density. This combination of properties makes silicon nitride a primary ceramic material being considered for inclusion in the hot sections of gas turbine engines. The drawbacks to silicon nitride include low impact strength, especially at elevated temperatures.

It has been reported in other ceramic systems (SiC) that provision of a porous surface layer, of the same ceramic, can result in slight improvements in impact strength by absorbing energy in a "crushing" fashion, see for example "Improved Toughness of Silicon Carbide," General Electric Company, NASA CR-134921, Nov. 1975.

A recent publication entitled "An Annodated Bibliography On Silicon Nitride For Structural Applications:" by the Metals and Ceramics Information Center of the Battelle Memorial Institute (1976) contains a comprehensive listing of technical articles relating to silicon nitride.

U.S. Pat. Nos. 3,966,885; 3,887,412, 3,885,294; 3,854,189; 4,118,539; and 4,090,851 deal with various aspects of silicon nitride technology. Technical articles by Poponiak et al in the *IBM Technical Disclosure Bulletin*, Vol. 18 No. 2 (1976) and Vol. 19 No. 3 (1976) deal with coatings for silicon nitride.

SUMMARY OF THE INVENTION

A porous layer of silicon containing silicon nitride is produced on the surface of a dense silicon nitride article. The layer contains about 15–45 volume percent elemental silicon. The porous surface layer greatly increases the impact properties of the resultant structure. The surface layer is of controlled porosity and grain size and is produced by forming a slurry of silicon particles in a disposable binder, applying a thin layer of this slurry to the surface of the dense article and then nitriding the slurry coated article. The nitride process partially converts the silicon particles in the slurry to silicon nitride and bonds them to each other and to the dense article. The resultant structure is also part of the invention. The porous layer may in turn be given a thin protective layer of fully dense pyrolytic silicon nitride appled by a gas decomposition technique.

DESCRIPTION OF THE PREFERRED EMBODIMENT

Ceramics such as silicon nitride have elevated temperature properties which make them extremely attractive candidate materials for high performance applications such as gas turbine engines. Ceramics in general, however, suffer from extremely limited impact strength. This limited impact strength is perhaps the major impediment to the use of ceramics in gas turbine engines. This invention provides a solution to this problem.

There are two major techniques for producing structural silicon nitride parts. The hot pressing technique employs silicon nitride in powder form which is then compacted at elevated temperatures and pressures to provide a solid material. It is virtually impossible to hot press silicon nitride particles without employing a densification aid such as Mg, $Al_2O_3$ or $Y_2O_3$. As used in this application, therefore, the phrase "hot pressed silicon nitride" will mean silicon nitride containing these densification aids in reasonable amounts such as about 1–5%. In the production of hot pressed silicon nitride, the objective is to produce fully dense material which is free from voids and pores. Parts of higher porosity can also be made using these additives and pressureless sintering techniques.

The other technique for producing structural silicon nitride is termed reaction sintering. In this process, the starting material is silicon metal powder which is compacted to produce an article which may have 30–40% porosity. This article is then nitrided at elevated temperatures to convert the silicon metal to silicon nitride and to simultaneously bond particles together. As a consequence of the volume increasing during nitriding the porosity of the final article will be reduced to perhaps 15–30%. A direct correlation has been established between density and strength and the objective in reaction sintering is to produce high density silicon nitride articles.

This invention involves the application of a relatively porous silicon nitride surface layer, containing 15–45% elemental silicon, to a high density silicon nitride substrate. The substrate may be either hot pressed silicon nitride or reaction sintered silicon nitride. Contrary to the previous teachings concerning reaction sintered silicon nitride, the surface layer is intentionally fabricated to have a high degree of porosity and further contains a significant quantity of unnitrided silicon. Such a surface layer has been found to provide a significant increase in impact properties.

The thickness of the surface layer desirably ranges from 0.25 to 2 mm and preferably from 0.5 to 1.5 mm. The amount of porosity in the surface layer is preferably from 20–50%.

Organic binders such as polystyrene dissolved in toluene and carbowax may be employed to provide increase green strength prior to firing. Such binders must be selected so as to be decomposable so that they vaporize, at a temperature less than the sintering temperature without leaving any deleterious residue.

Various tests have shown that a sharp change occurs in the impact strength of coated substrates, as a function of silicon level, when the unreacted silicon content is in the range of about 14 to 21 percent. Impact properties of layers containing 14 percent silicon and less are low while impact properties of layers containing greater than 21 percent silicon are high. The silicon contents are measured optically and by X-ray diffraction methods and are subject to some variation depending upon the observer and the measurement system used. Based on this, the broad low limit appears to be about 15 percent and the preferred low limit appears to be about 20 percent unreacted silicon.

The upper limit is not so well defined. Useful improvements in impact strength have been observed for unreacted silicon levels of 35%. At 60% unreacted silicon, however, the improvement in properties was minimal. Large amounts of unreacted silicon are not necessarily desirable since in a high temperature use, such as a gas turbine, the unreacted silicon (melting point 1412° C.) could melt and degrade the porous coating properties during short temperature exposures. The silicon nitride can withstand brief exposures to much higher temperatures. For this reason, the broad upper limit for unreacted silicon is 45% and the preferred high limit for unreacted silicon is 30%.

The preceding limits for unreacted silicon appear to hold, irrespective of particle size, at least over the range of $-100$ mesh to $-325$ mesh particles. These particle sizes appear to constitute the range of practical particle sizes. For particles much larger than $-100$, nitridation to the necessary degree cannot be achieved in reasonable times. On the other hand, for particles much smaller than $-325$ mesh, it may be difficult to adequately control the nitriding process.

The nitriding step may be performed in either pure nitrogen ($N_2$) or a nitrogen-hydrogen mixture such as a 96%$N_2$,4%$H_2$ mixture which is commercially available. The impact properties of the coatings do not vary significantly as a result of nitriding in pure $N_2$ or 96%$N_2$,4%$H_2$. Thus these gas mixes are essentially interchangeable. It is observed that the nitriding process is faster in the nitrogen hydrogen mixture and the resultant structure has superior properties when measured in a bending test which places the coating in tension. For these reasons, the mixture of the nitrogen and hydrogen appears to be preferred.

This invention may be better understood through consideration of the following illustrative examples: the Si powder was made into a thick slurry using toluene as the carrier liquid with 4 weight percent polystyrene dissolved in it for additional green strength. Both Charpy and ballistic samples of hot pressed $Si_3N_4$ (fabricated from material supplied by the Norton Co., Worcester, Mass.) were then coated with about 1 mm of the slurry on one face and then dried overnight at a temperature of about 150° C. The coated samples were then loaded into molybdenum boats with loose fitting lids and placed in a horizontal tube furnace. The firing cycle consisted of 16–20 hours at 1100° C. in flowing argon, 16–20 hours at 1250°–1325° C. in flowing $N_2$ or 96%$N_2$/4%$H_2$.

Table I gives a sampling of conditions for various silicon powder mesh sizes for 1 mm thick layers. The adherence of the partially nitrided coating to the substrate was found to be quite good. The porous coating was resistant to thermal cycling.

TABLE I

| SAMPLE DESIGNATION | SILICON PARTICLE SIZE | NITRIDING GAS | MAXIMUM NITRIDING TEMP., °C. | NITRIDING TIME AT MAXIMUM TEMP., HRS. | % UNNITRIDED SILICON |
|---|---|---|---|---|---|
| A | $-100/+200$ | $N_2$ | 1375–1400 | 60 | 15–25 |
| B | $-100/+200$ | $N_2$ | 1375 | 24 | 25–30 |
| C | $-100/+200$ | $N_2$ | 1375 | 8 | 60 |
| D | $-100/+200$ | $N_2$ | 1300 | 8 | 90 |
| E | $-200$ | $N_2$ | 1375 | 60 | $<1$ |
| F | $-200$ | $N_2$ | 1375 | 1 | 30 |
| G | $-200$ | $N_2$—$H_2$ | 1375 | 2 | 6 |
| H | $-200$ | $N_2$—$H_2$ | 1375 | 1½ | 14 |
| I | $-200$ | $N_2$—$H_2$ | 1375 | 1 | 21 |
| J | $-200$ | $N_2$—$H_2$ | 1375 | ½ | 25 |
| K | $-325$ | $N_2$ | 1375 | 8 | $<1$ |
| L | $-325$ | $N_2$ | 1375 | 1 | 20 |
| M | $-325$ | $N_2$—$H_2$ | 1375 | 1 | 5 |
| N | $-325$ | $N_2$—$H_2$ | 1375 | ½ | 20 |

Example 1

The Charpy impact properties of coated and uncoated silicon nitride samples (Norton NC-132) were evaluated using a modified Charpy impact tester and unnotched samples having dimensions of ¼"×¼"×2". These samples were struck by a weighted pendulum and the impact properties of the sample were evaluated by measuring the change in pendulum motion due to the impact. The Charpy impact test is described in more detail in *Mechanical Metallurgy* by G. E. Dieter, McGraw-Hill Book Company, 1961, pages 371–375. For uncoated hot pressed silicon nitride samples, the average impact energy absorbed at room temperature was 0.4 joules. At 1370° C., the impact energy absorbed was also 0.4 joules. Similar samples were prepared having a reaction sintered coating of porous silicon nitride produced from $-100$, $+200$ mesh silicon according to the previously described process and nitrided to contain about 25% unreacted silicon. The coating thickness ranged from 1.0 to 1.2 mm. At room temperature these coated samples absorbed an average of 0.94 joules and at 1370° C. the average absorbed energy was 0.8 joules. Thus, it can be seen that over a wide temperature range, a porous coating containing nonreacted silicon can double the Charpy impact strength.

EXAMPLE 2

The effect of the present invention on impact properties was extensively evaluated using ballistic impact testing. The procedure was that a sample of the material to be evaluated was held in a vise so that a portion having a size of 1"×1"×¼" protruded from the vise. A modified gas gun was used to fire steel pellets at the center of a 1"×1" face of the sample at controlled velocities. The initial velocity used was 150 m/sec., and the test was repeated at increasing velocities until failure of the coating or the substrate was observed. Uncoated control samples (of Norton NCX-34 material) absorbed an average of 2.6 joules energy at room temperature. The effect of the addition of a 1 mm thick reaction sintered silicon nitride layer formed from −200 mesh silicon powder, nitrided to produce varying degrees of nitridation, is shown in Table II.

TABLE II

| PERCENT UNREACTED Si | TEST TEMP. | ABSORBED IMPACT ENERGY |
|---|---|---|
| * | R.T. | —/2.8 |
| 0 | R.T. | 6.2/9.1 |
| 14 | R.T. | 6.2/9.1 |
| 21 | R.T. | 15.4/17.2 |
| 25 | R.T. | 15.4/17.2 |
| * | 1370° C. | —/2.6 |
| 25 | 1370° C. | 11.4/13.6 |

*No Surface Layer

In Table II, the first impact energy value is the highest impact energy at which no substrate damage occurred and the second value is the lowest impact energy at which substrate fracture occurred. The true ballistic impact strength is somewhere between the values shown in the table.

Referring to Table II, it can be seen that a substantial increase in properties occurs between 14 and 21 percent unreacted silicon. Layers having 21% and 25% unreacted silicon have about six or eight times the impact strength of uncoated samples.

EXAMPLE 3

Partially nitrided layers 1 mm thick were produced from −325 mesh silicon powder. Nitriding conditions were varied to vary the amount of unreacted silicon. The results of ballistic impact testing are shown in Table III.

TABLE III

| PERCENT UNREACTED Si | TEST TEMP. | ABSORBED IMPACT ENERGY |
|---|---|---|
| * | R.T. | —/2.8 |
| 0 | R.T. | 6.2/9.1 |
| 5 | R.T. | 6.2/9.1 |
| 20 | R.T. | 13.6/15.4 |
| * | 1370° C. | —/2.6 |
| 5 | 1370° C. | 6.2/9.1 |
| 20 | 1370° C. | 13.6/15.4 |

Again it can be seen that a porous surface layer increases the impact energy required to cause fracture. It can also be seen that a significant increase in energy absorbed occurred between samples with coatings containing 5% Si and samples with coatings containing 20% Si. This is observed both at room temperature and 1370° C.

These examples demonstrate the effectiveness of a porous silicon nitride layer, containing elemental silicon, in increasing the impact strength of fully dense silicon nitride articles.

EXAMPLE 4

A layer of pyrolytic silicon nitride was applied to a porous reaction sintered silicon nitride surface; $3.8 \times 10^{-3}$ moles/min. of $SiF_4$ mixed with $7.5 \times 10^{-3}$ moles/min. of $NH_3$ was passed into a reaction chamber which was maintained at a pressure of 2 mm. The article to be coated was held in the reaction chamber at a temperature of 1450° C.

The resultant coating was dense and adherent and was found to be more abrasion resistant than the uncoated surface. Other gases including $SiCl_4$ might be substituted for the $SiF_4$ and $N_2$ might be used in place of $NH_3$.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A method for improving the impact strength of a dense silicon nitride article which comprises:
    a. applying a layer of a silicon powder slurry to at least one surface of the article;
    b. heating the slurry coated article to remove the liquid slurry constituent;
    c. nitriding the slurry layer to partially convert the silicon powder to silicon nitride and simultaneously bond the silicon powder layer to the dense silicon nitride article to form a porous crushable surface layer comprised of silicon nitride containing from 15–45% of unnitrided silicon.

2. A method as in claim 1 wherein the thickness of the surface layer is about 1 mm.

3. A method as in claim 1 wherein the surface layer has a residual porosity of from about 20 to about 50 percent.

4. A method as in claim 1 wherein a protective, thin, dense layer of pyrolytic silicon nitride is applied to the porous surface layer after the nitriding step.

5. An impact resistant silicon nitride article which comprises:
    a fully dense silicon nitride substrate having a surface layer bonded thereto, said surface layer being a porous mixture of silicon and silicon nitride, said surface layer having 20–50% porosity with the nonporous remainder comprising 15–45% silicon, balance essentially silicon nitride.

* * * * *